(12) United States Patent
Walter

(10) Patent No.: US 9,693,116 B2
(45) Date of Patent: *Jun. 27, 2017

(54) SYSTEM AND METHOD FOR PROCESSING IMAGE OBJECTS IN VIDEO DATA

(71) Applicant: AT&T Intellectual Property I, L.P., Atlanta, GA (US)

(72) Inventor: Edward A Walter, Boerne, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 552 days.

This patent is subject to a terminal disclaimer.

(21) Appl. No.: 13/784,315

(22) Filed: Mar. 4, 2013

(65) Prior Publication Data

US 2013/0318551 A1 Nov. 28, 2013

Related U.S. Application Data

(63) Continuation of application No. 12/390,217, filed on Feb. 20, 2009, now Pat. No. 8,413,188.

(51) Int. Cl.
| | |
|---|---|
| *H04N 21/4545* | (2011.01) |
| *H04N 21/4728* | (2011.01) |
| *G06K 9/00* | (2006.01) |
| *G06K 9/46* | (2006.01) |
| *G06F 17/30* | (2006.01) |
| *H04N 21/83* | (2011.01) |
| *H04N 7/173* | (2011.01) |
| *H04N 21/2343* | (2011.01) |
| *H04N 21/44* | (2011.01) |
| *H04N 21/472* | (2011.01) |

(52) U.S. Cl.
CPC .......... *H04N 21/83* (2013.01); *G06F 17/3079* (2013.01); *G06F 17/30259* (2013.01); *G06F 17/30277* (2013.01); *G06F 17/30831* (2013.01); *G06K 9/00744* (2013.01); *G06K 9/4604* (2013.01); *H04N 7/17318* (2013.01); *H04N 21/234318* (2013.01); *H04N 21/44012* (2013.01); *H04N 21/45455* (2013.01); *H04N 21/4728* (2013.01); *H04N 21/47205* (2013.01)

(58) Field of Classification Search
CPC .......... H04N 21/4728; H04N 21/45455; G06F 17/30831; G06F 17/30259; G06K 9/00744; G06K 9/4604
See application file for complete search history.

(56) References Cited

U.S. PATENT DOCUMENTS 5,809,267 A * 9/1998 Moran et al. ................ 715/863
6,357,042 B2 3/2002 Srinivasan et al.
(Continued)

*Primary Examiner* — Benjamin R Bruckart
*Assistant Examiner* — Jason Thomas
(74) *Attorney, Agent, or Firm* — Guntin & Gust, PLC; Joseph Hrutka

(57) ABSTRACT

A system, method and computer program product are disclose for processing an object in a video data stream. The method runs on a processor programmed to execute the method and includes but is not limited to receiving input data at the client device for rendering on the client device display a first functional indicator indicating one of a plurality of functions and surrounding a first region of pixel locations representing a first image object in the video data stream; and performing a function indicated by the first functional indicator on meta data for the first image object in the first region of pixel locations.

13 Claims, 6 Drawing Sheets

(56) References Cited

U.S. PATENT DOCUMENTS

| | | |
|---|---|---|
| 2002/0103797 A1* | 8/2002 | Goel et al. .................... 707/5 |
| 2003/0070175 A1 | 4/2003 | Panabaker |
| 2005/0086690 A1* | 4/2005 | Gilfix et al. ................ 725/42 |
| 2006/0282309 A1 | 12/2006 | Zhang et al. |
| 2007/0016921 A1 | 1/2007 | Levi et al. |
| 2007/0121568 A1 | 5/2007 | van As et al. |
| 2008/0021818 A1 | 1/2008 | Fish |

* cited by examiner

SYSTEM AND METHOD FOR PROCESSING IMAGE OBJECTS IN VIDEO DATA

CROSS REFERENCE TO RELATED APPLICATIONS

This application is a continuation of and claims priority from U.S. patent application Ser. No. 12/390,217 filed on Feb. 20, 2009 and entitled A System And Method For Processing Image Objects In Video Data, which is hereby incorporated by reference in it's entirety.

BACKGROUND

Field of Disclosure

The disclosure relates to the field of video data distribution systems and more specifically to systems and methods for processing image objects in a video data stream.

Description of Related Art

Targeted advertisements have historically been mailed to large targeted geographic areas such as a particular city, so that regional advertisers reach only persons who are deemed by the advertiser as most likely to be responsive to their advertisements. Advertisements are a component in digital video services, including live or pre-recorded broadcast television TV, special or pay-per-view programming, video on demand (VOD), and other content data choices available to subscribers.

BRIEF DESCRIPTION OF THE DRAWINGS

For detailed understanding of the illustrative embodiment, references should be made to the following detailed description of an illustrative embodiment, taken in conjunction with the accompanying drawings, in which like elements have been given like numerals.

DETAILED DESCRIPTION OF THE DISCLOSURE

Figure 1:
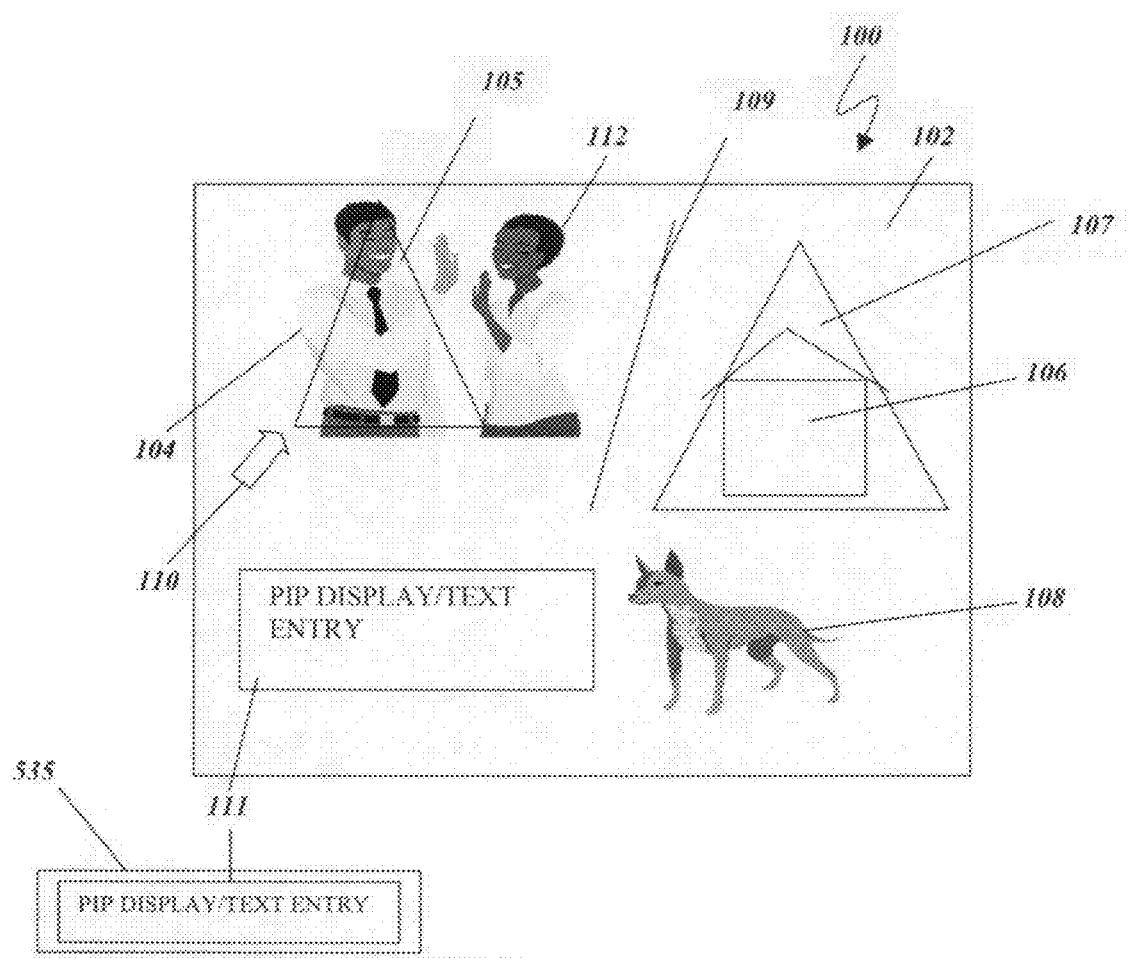
FIG. 1 is a schematic depiction of a graphical representation on an illustrative embodiment of a client device display in an illustrative embodiment.

In the following description, for purposes of explanation, numerous specific details are set forth in order to provide a thorough understanding of an embodiment of the present invention. It will be evident, however, to one skilled in the art that the present invention may be practiced without these specific details. This disclosure describes a system, method and computer program product for performing functions such as shopping, searching, storing, comparing and sending messages containing or relating to meta data for objects contained in and selected from a video data stream. The objects can be anything, including but not limited to an image object or associated audible sound in a video data stream. The objects represents items of interest in the video stream including but not limited to objects such as actors, actresses, cars, scenery and clothing from a video data stream being displayed on a client device. The video data stream includes meta data describing the objects that appear in the video data stream. For purposes of example an image object processing system, method and computer program product are disclosed herein by way or example, however, the example is not intended to limit the scope of the invention as other objects rather than image objects, for example, audio, video or graphic objects may be selected for processing in another embodiment.

In another embodiment meta data describing or associated with the image objects are stored at a server and not included in the video data stream. Thus, in a particular illustrative embodiment, a viewer can draw a functional indicator (such as a square, triangle, pentagon, hexagon or circle rendered on a client device display) around an image object such as an actor or actress in a video stream to perform a function (shop, search, store, compare and send message) on information about the actor or actress. Thus a user can surround pixels representing an image object to shop, search, store, compare or send a message regarding the selected image object. Different meta is placed in meta data categories and tagged with a unique meta data category identifier code associated with each meta data category (shop, search, send, store and compare) indicated by a unique meta data category identifier code (shop, search, store, compare and send message) for each image object. When a function (shop, search, store, compare and send message) is invoked by a functional indicator (shop, search, store, compare and send message), meta data in a meta data category (shop, search, store, compare and send message) that matches the functional indicator is retrieved for processing by the function indicated by the functional indicator. Whether the meta data is in the data base or included in the video data stream, the meta is accompanied by meta data category identifier codes which are placed to indicate to which meta data category the meta data belongs. For example, for a particular image object, such as an actor, meta data for the actor's clothing and jewelry are tagged with a shop meta data category identifier code in a shop meta data category and used for the shop function. Meta data for the actor himself is identified by inserting a search meta data category identifier code along with the search meta data and used for the search function. Meta data for both the actor himself (identified as belonging to the search meta data category) and the actor's clothing and jewelry (identified as belonging to the shop meta data category) are identified by meta data categories identifier codes inserted at the server used for the send function. Merchandize such as clothing and jewelry worn by an actor is described in meta data associated with the image object and is used as search terms for internet shopping. A user can use clothing and jewelry meta data to shop on EBay™ or other internet cites for merchandize associated with an image object. A user can use meta data associated with the actor himself as search terms to search general search engines on the internet or other data bases to obtain information about the actor. A user can use meta data associated with the actor himself and the actor's clothing and jewelry as search terms to send a message to another user.

A viewer can perform the search, shop and send functions on more than one object by drawing a functional indicator, such as a square, triangle or circle around an image object. As the viewer draws the functional indicator by manipulating an input device such as a remote control in data communication with the client device processor, the client device processor renders the drawn functional indicator on the client device display. The triangle indicates send message associated with the meta data for the image objects, and the circle indicates search on the image objects and the triangle indicates send the meta data associated with the image objects. A viewer can further direct performance of functions on the image objects by drawing a Boolean indicator between the functional indicators. In a particular embodiment, a single line drawn on the video data frame between two functional indicators causes a Boolean OR logic operation to be performed on the image objects function prior to performing the search, send or store function indicated by the square, circle or triangle drawn around the image object. In another particular embodiment, a pair of intersecting lines drawn on the video data frame between two functional indicators causes a Boolean AND logic operation to be performed on the image objects prior to performing the search, send or shop function indicated by the square, circle or triangle drawn around the image object.

In another particular embodiment a "group selection" type function is provided where multiple image objects are selected in a single action. In a particular embodiment, this is accommodated with a simple click one area, hold, and drag over multiple objects/area of the screen. In another embodiment, this action further performs a COMPARE type function between two or more objects. For example, when two actors/actresses on the screen are selected together, information about similar movies or details is be presented. In another embodiment, selections whether a single object or multiple objects have the capability to group together and send to another IP enabled device for manipulation at a later date, for example, captured on a TV STB and passed to a PC or mobile device in the home for manipulation. Also, the STORE option was allow earlier selections to be compared to a later image object selection using the compare function.

In a particular embodiment, a computerized method is disclosed for processing an object in a video data stream executed on a server processor programmed to execute the steps of the method, the method including but not limited to receiving at a client device, the video data stream from a server; displaying the video data stream at the client device on a client device display; receiving input data at the client device for rendering on the client device display a first functional indicator indicating one of a plurality of functions and surrounding a first region of pixel locations containing a first image object in the video data stream; and performing a function indicated by the first functional indicator on meta data for the first image object in the first region of pixel locations. In another embodiment of the method the functional indicator indicates a function selected from the group consisting of search, send, store, compare and shop and the meta for the first image object further comprises meta data in one of a plurality of meta data categories selected from the group consisting of search, send, store, compare and shop associated with one of a plurality of functional indicators, the method further including but not limited to selecting meta data indicated by a meta category indicator in a meta data category associated with the functional indicator.

In another embodiment of the method the method further includes but is not limited to receiving input data for rendering a second functional indicator indicating one of the plurality of functions and surrounding a second region of pixels representing a second image object and performing the function indicated by the first functional indicator on the meta data for first image object and meta data for the second image object. In another embodiment of the method rendering further comprises rendering the first functional indicator using a remote control cursor on the video data frame comprising a closed geometric form. In another embodiment of the method the closed geometric form is selected from the group consisting of a circle, square, pentagon, hexagon and triangle further indicates a function selected from the group consisting of search, send, store, compare and shop, wherein the circle indicates search, the square indicates shop and the triangle indicates send.

In another embodiment of the method the method further includes but is not limited to rendering a Boolean indicator on the video data frame comprising at least one line on the video frame between the first and second functional indicators to indicate a Boolean logic operation to operate on meta data for the image objects surrounded by the first and second functional indicators, the Boolean logic operation selected from the group consisting of AND, OR, NOT and EXCLUSIVE OR. In another embodiment of the method the at least one line further comprises a rendering selected from the group consisting of a single line indicating a Boolean AND logic operation and two intersecting lines indicating a Boolean OR logic operation. In another embodiment of the method the first region of pixels contains at least two image objects upon which the function performs. In another embodiment of the method, the method further includes but is not limited to freezing the video frame for rendering functional and Boolean indicators on the frame. In another embodiment of the method the first image object is a data item selected from the group consisting of an actor, a location and an article of clothing included in the video data stream.

In another embodiment, a tangible machine readable is disclosed containing a computer program for processing an object in a video data stream, the computer program comprising instructions to receive at a client device, the video data stream from a server; instructions to display the video data stream at the client device on a client device display; instructions to receive input data at the client device for rendering on the client device display a first functional indicator indicating one of a plurality of functions and surrounding a first region of pixel locations representing a first image object in the video data stream; and instructions to performing a function indicated by the first functional indicator on meta data in a meta data category associated with the first functional indicator for the first image object in the first region of pixel locations.

In another embodiment, a system is disclosed for processing an object in a video data stream, the system including but not limited to a processor in data communication with a computer readable medium; a first processor interface to receive at a client device, the video data stream from a server; a second processor interface to send data to display the video data stream at the client device on a client device display; a third processor interface to receive input data at the client device for rendering on the client device display a first and second functional indicator, each functional indicator indicating one of a plurality of functions and surrounding a first and second region of pixel locations representing a first and second image object in the video data stream; a fourth processor interface to receive data to perform Boolean logic operation on meta data for the first and second image objects in a meta data category associated with the first functional indicator; and a fifth processor interface to receive data to perform a function indicated by the first functional indicator on the meta data for the first and second image objects in a meta data category indicated by a meta data category identifier code associated with the first functional indicator after the Boolean logic operation.

In another embodiment, a computerized method is disclosed for processing an object in a video data stream, the method executed on a server processor specifically programmed for executing the steps of the method, the method including but not limited to sending from a server to a client device video data containing image objects, meta data category identifier code data and meta data category data associated with the image objects in a plurality of meta data categories indicated by the meta data category indicator codes in the video data stream; and receiving data from the client device indicating one of a plurality of functional indicators indicating one of a plurality of functions and meta data in one of a plurality of meta data categories. In another embodiment of the method the functional indicator indicates a function selected from the group consisting of search, send, store, compare and shop and the meta further comprises meta data indicator codes indicating one of a plurality of meta data categories and selected from the group consisting of search, send, store, compare and shop associated with one of a plurality of functional indicators. In another embodiment of the method, the method further includes performing on meta data in a meta data category used by the function indicated by the functional indicator; and sending data indicating a result of the performing the function to the client device.

In another embodiment, a tangible machine readable is disclosed containing a computer program for processing an object, the computer program comprising instructions to send from a server to a first client device video data including image objects, meta data category indicator identifier code data and meta data associated with the image objects in a plurality of meta data categories, the video data stream from a server; instructions to receive data from the client device indicating one of a plurality of functional indicators indicating a function selected from the group consisting of search, send, store, compare and shop and meta data in one of a plurality of meta data categories selected from the group consisting of search, send, store, compare and shop associated with one of the plurality of functional indicators. In another embodiment of the medium, the computer program further comprising instructions to perform on the meta data, the function indicated by the functional indicator; and instructions to sending indicating a result of the performing the function to a second client device from the first client device.

In another embodiment, a system for processing an object in a video data stream is disclosed, the system including but not limited to a processor in data communication with a machine readable medium; a first processor indicator for embedding meta data codes in meta data indicating meta data categories; a second processor interface to send to a client device video data including image objects and meta data category identifier codes identifying at least one of a plurality of meta data categories associated with the image objects; and a third processor interface to receive data from the client device indicating one of a plurality of functional indicators indicating one of a plurality of functions and meta data in one of the plurality of meta data categories. In another embodiment of the system, the functional indicator indicates a function selected from the group consisting of search, send, store, compare and shop and the meta further comprises meta data in one of a plurality of meta data categories selected from the group consisting of search, send, store, compare and shop associated with one of a plurality of functional indicators. In another embodiment of the system, the system further includes but is not limited to a third processor interface to receive data to perform in the processor the function indicated by the functional indicator on the meta data; and a fourth processor interface to send data indicating a result of the performing the function to the client device.

In another embodiment the meta data is not in the video data stream, but is stored on another server and the correct meta data to display (describing an object selected from the video data stream) are retrieved from the server side. For instance, in a particular embodiment, the client device does not have access to an MPEG 7 encoded video data stream having meta data encoded within the MPEG 7 encoded video data stream. In a particular embodiment, a client device (such as a cell phone or "IPHONE"™), which is telling the STB where to display a cursor to draw a functional indicator on the video frame, senses when an end user presses a button on the IPHONE, freeze or stop the video data stream on the video data frame and allow the IPHONE to direct rendering of the functional indicator around an image object on the video frame. Then when the end user presses the button on the remote control or on the client device (i.e., "click time"), the client device sends the coordinates of the cursor at click time to the server side for processing at the server. This server side knows when the end user device started the movie or TV program and also knows the frame rate of that movie so it can figure out on which frame the movie is on when the cursor is clicked by the client device displaying the video data (display device) or a second client device acting as a cursor control which directs the cursor position in the video data stream displayed on the display client device. And on the server side, it also has a server side database of frame to content mapping. (e.g., at frame 55-78, at pixel locations defined by some region, is this item or actress). So the server will know the frame, and will get the cursor location from the IPhone™ or other client device, so the server will be able to figure out if the end user device was pointing at an identifiable object in the video data stream.

Image objects such as an article of clothing which an actor or actress is wearing in a video stream can also be selected by the viewer by drawing a functional indicator around the image object send a message or shop using the meta data for the image object as search terms to shop or as the content of a message to send. Another object appearing in a scene from a video stream, such as a car or location landmark such as a mountain peak in the back ground of a scene can be selected by a functional indicator upon which to perform a function. The information about the selected object can presented as displayed in a picture in picture (PIP) window on the display along with the video stream from which the object is selected or can be presented as announced from a loud speaker or other sound reproductive device on the client device or a peripheral in data communication with the client device. In another embodiment, the video data stream is displayed on a first client device such as a television connected to a set top box, and information data is presented on a second end user device such as an IPHONE™. In another embodiment, the IPHONE™ is also used to move the draw cursor icon around a display of the video data stream on the STB end user device.

In another embodiment, a user can manipulate a remote control (RC) to manipulate the draw cursor icon to draw a functional indicator including but not limited to a circle, square, triangle or another closed geometric form around one or more image objects displayed on the client device. A graphic object recognition function in the client device or server processor recognizes the closed geometric forms around the objects displayed at the client device as squares; circles and triangles. In another embodiment Boolean indicators including but not limited to a single line and two intersecting lines are drawn between functional indicators are recognized by graphic object recognition function to indicate a Boolean AND logic operation and Boolean OR logic operation respectively. A particular function is associated with each shape. In another embodiment, a user can draw multiple closed geometric forms, such as circles, triangles and squares around multiple objects to include all objects in a request to perform a function on image object data in a video data frame. In another embodiment, an accelerometer-equipped remote control is manipulated with gestures to draw enclosing geometric forms around objects displayed on the client device to be included in a request for information. In another embodiment, an object from a video stream from a live event is selected for the information data presentation. In the live event, the meta data included in the video stream is less specific because the live action is unscripted and unpredictable thus cannot be preprogrammed into the meta data. For example, an image of Derek Jeter of the New York Yankees (NYY) can be selected as an object from a live video stream presentation of live event and combined with meta data in the video data stream about the NYY to identify the object as an image of Derek Jeter. In another embodiment, the meta data about the NYY includes a reference image or a pointer to a reference image of Derek Jeter for use in comparison of the reference image to the selected object in identifying the selected image as Derek Jeter.

Turning now to FIG. 1, an illustrative embodiment 100 of a client device display 102 is depicted. As shown in FIG. 1, objects 104, 112, 106 and 108 appear on the display and can be selected by drawing a functional indicator with draw cursor icon 110 for performing a function on meta data for the image object. A draw cursor icon 110 is displayed which selectable by a viewer at the client device which used to draw functional indicators and Boolean indicators on the client device display. In a particular embodiment, the meta data associated with the image objects is contained in the video data stream. In another particular embodiment, the meta data associated with the image objects is stored in a data base at the server or client device and accessed in the data base. In an illustrative embodiment, as shown in FIG. 1, a first image object 104 which can be for example representative of an actor, such as Will Smith is selected by functional indicator 105 as drawn by draw cursor icon 110. A second image object 106, for example, representative of a house appearing in the same video data frame is selected by functional indicator 107 as drawn by draw cursor icon 110.

In an illustrative embodiment, the client device processor obtains the current video frame in the video stream from a time expired in the video stream presentation from start time of the video stream presentation and determines a pixel location within a region of pixels within the determined video frame within a functional indicator drawn by the draw cursor icon. The client device processor then determines from the meta data associated with the video frame and pixel location and determines the identity of the selected first and second selected objects from the meta data. The meta data may include key words or reference images in a data base at the client device or IPTV system that are used as functional operator terms to perform a search, shop or send message function on the image objects using the meta data associated with the selected object.

For example, in a particular embodiment, the triangles 105 and 108 are functional indicators for a SEND MESSAGE function. Thus, upon detection of the functional indicators 105 and 108 drawn on the video frame, a processor performs a SEND MESSAGE function (as indicated by the triangles 105 and 108) by collecting meta data for the selected image objects 104 and 106 appearing in the video frame. The meta data is accessed and collected from the video data stream or a data base at the server or client device. The meta data is presented in picture-in-picture display/text entry box 111. A viewer enters an addressee selected from other viewers or subscribers to a data communication network such as an internet protocol television (IPTV) system. A message containing the meta data is sent to the addressee designated by the viewer as entered into picture-in-picture display/text entry box 111. Thus, in the present example, a viewer can send a message including but not limited to the image objects and meta data associated with the image actor Will Smith 104 and Will Smith's house 106 to a friend or designee, as designated by the viewer data entry of text into the picture-in-picture display/text entry box 111. A user can enter additional text and edit meta data text appearing in the picture-in-picture display/text entry box for inclusion in the message.

meta data associated with the image objects 104 and 106 from the meta data about the selected object are presented texturally or graphically in a picture-in-picture display/text entry box 111 on the client device display screen or announced audibly from a sound reproduction device built in to the STB or a sound reproduction device on a peripheral in data communication with the STB. In another embodiment a second client device, for example a mobile phone 533, such as an IPHONE is used as a remote control to control the draw cursor icon position and select objects on a first client device display, for example a television connected to the set top box. When an object is selected, a cursor position and time are sent back to the server which associates the draw cursor icon position and time with an object in the video data stream. The information data 111 can also be displayed on the mobile phone display 533 instead of the client device display. The edited meta data message text is presented in picture-in-picture display/text entry box 111 is sent to the addressee, as designated by the viewer at the first client display and presented in a picture-in-picture display/text entry box 111 on a client device display associated with the addressee. The addressee can manipulate and perform functions describer herein by drawing functional indicators on the received image objects and meta data received in a message.

In another particular embodiment, a subscriber uses the client display remote control to manipulate the draw cursor icon 110 to draw a Boolean operator 109 as a single line between functional indicators 105 and 108. In a particular illustrative embodiment, a single line drawn between two of a plurality of functional indicators such as 105 and 108 on the client display indicates a Boolean OR logic operation to be used on the image objects surrounded by the two functional indicators. Thus, using the Boolean OR logic operation, meta data associated with either the first image object 104 or associated with the second image object 106 are collected and displayed in the picture-in-picture display/text entry box 111 for inclusion in a message. In another particular embodiment, a second Boolean logic operation including two intersecting lines is drawn between two of a plurality of functional indicators indicates a Boolean AND logic operation to be used on the image objects surrounded by the two functional indicators. Thus, using the Boolean AND logic operation, meta data associated with both the first image object 104 and the second image object 106 are collected and displayed in the picture-in-picture display/text entry box 111 for inclusion in a message.

Figure 2:
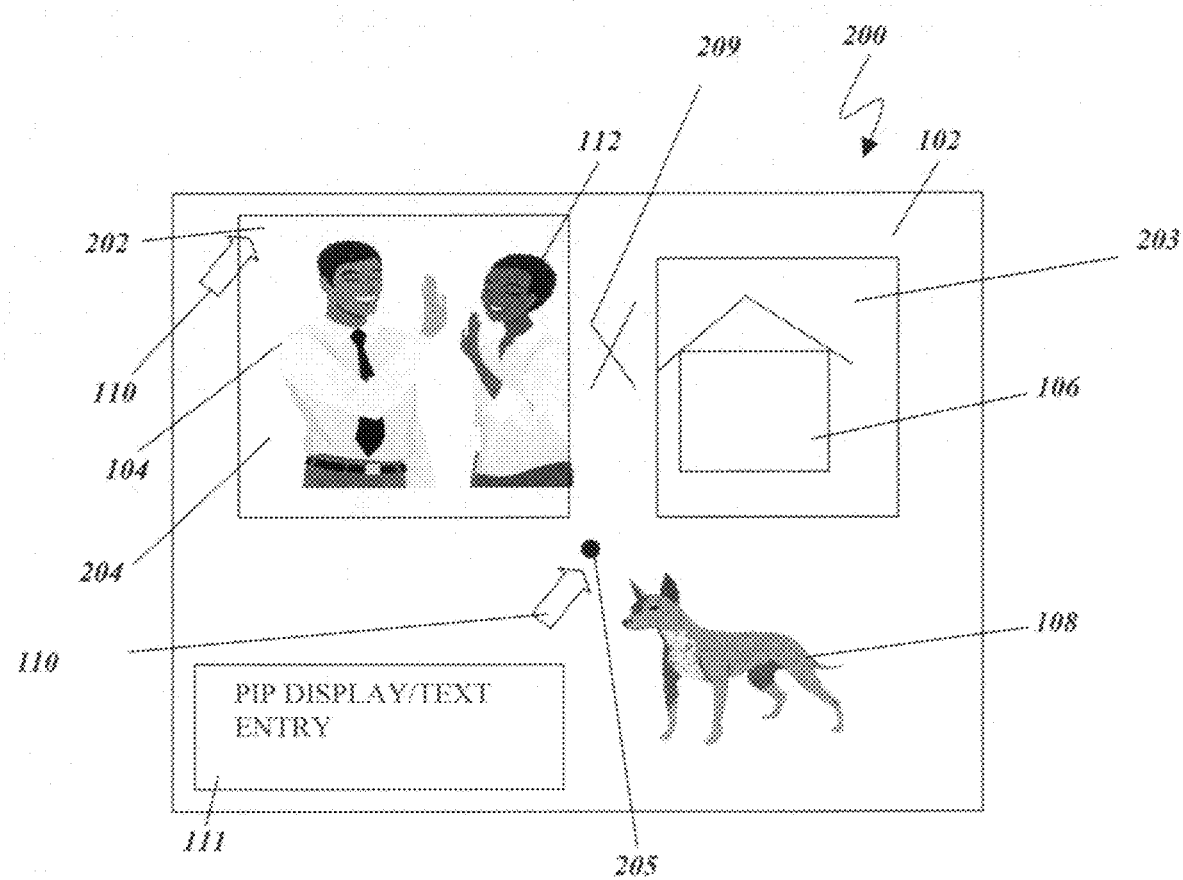
FIG. 2 is a schematic depiction of a graphical representation on an illustrative embodiment of a client device display in an illustrative embodiment.

Turning now to FIG. 2, in another embodiment, a square functional indicator 204 as shown in FIG. 2 is drawn by a user remote control on a client device display including more than one image object. The two image objects 104 and 112 within the region of pixels surrounded by the functional indicator 202 and the house 106 within the region of pixels surrounded by functional indicator 203 are considered in performing an indicated function on a client device. In a particular embodiment, when more that one image object is included in a single functional indicator, meta for all image objects within the functional indicator are included in performing the function. Thus, image objects within a single functional indicator are treated as a Boolean AND logic operation. To define the region of pixels the draw cursor icon 110 is used to draw a first functional indicator 202 to enclose a first region of pixels surrounding image objects 104 and 112 and to draw a second functional indicator 203 to enclose a second region of pixels enclosing a third image object 106. By selecting the RC cursor button to select the draw cursor icon and dragging the draw cursor icon across the client device display screen, a user draws functional indicators on client device display. In a particular embodiment, the square functional indictor indicates a SHOP function. Thus, in a particular illustrative embodiment, the SHOP function operates on the META data for image objects 104, 112 and 106. As shown in FIG. 2 a viewer can also draw a Boolean indicator 209 between the functional indicators 203 and 202. In FIG. 2, an example of a Boolean indicator 209 is two intersecting lines which indicate a Boolean OR logic operation. Thus, the functional indicator, in the present example of FIG. 2, a SHOP function operates on the image objects first performing a Boolean AND for objects within each functional indicator, in this case 104 and 112 within functional indicator 202 meta data and then performs a Boolean OR logic operation between those image objects included within the first functional indicator and those image objects within the second functional indicator. Thus, in FIG. 2, the function operates only on meta data which is associated with both image objects 104 and 112 or image object 106.

Figure 3:
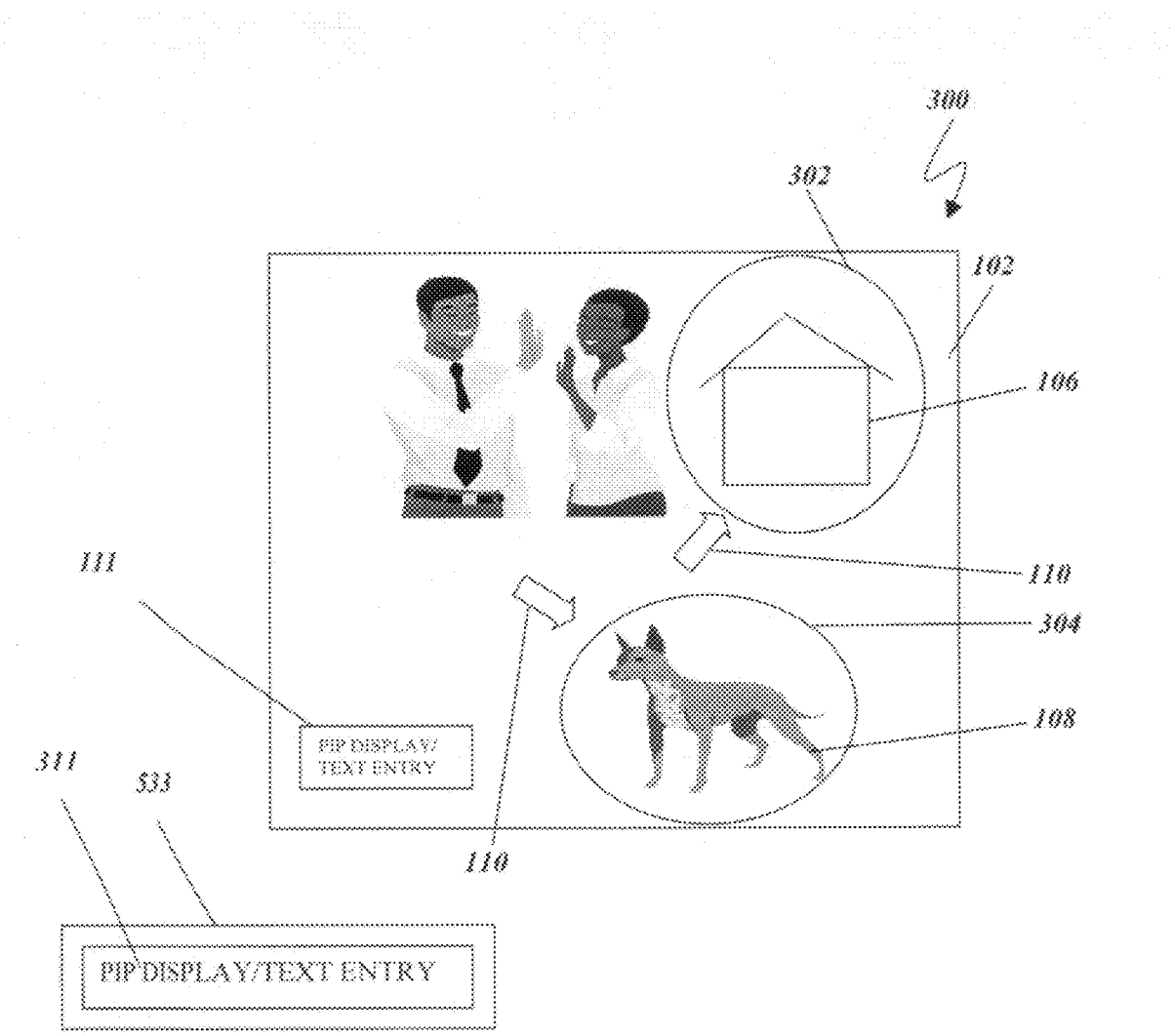
FIG. 3 is a schematic depiction of a graphical representation on an illustrative embodiment of a client device display in an illustrative embodiment.

Turning now to FIG. 3, a graphical representation of another illustrative embodiment 300 is shown in which separate circles 302 and 304 are drawn around each image object 106 and 108 respectively displayed on a client device display such as a television connected to a set top box. In a particular illustrative embodiment, the circles indicate a search function. meta data associated with image objects 106 and 108 are collected from the data base or video data stream and used as search terms in a search engine to perform a search in a database accessible to the client device via the data communication system, which can be the Internet. In this embodiment a house 106 and dog 108 displayed on a television are selected for a search of meta data for image objects 106 and 108. The results of the search are presented to a viewer in an information data presentation as a display in picture in picture and text entry window 311 or audible announcement at another client device 533 such as a mobile phone.

Figure 4:
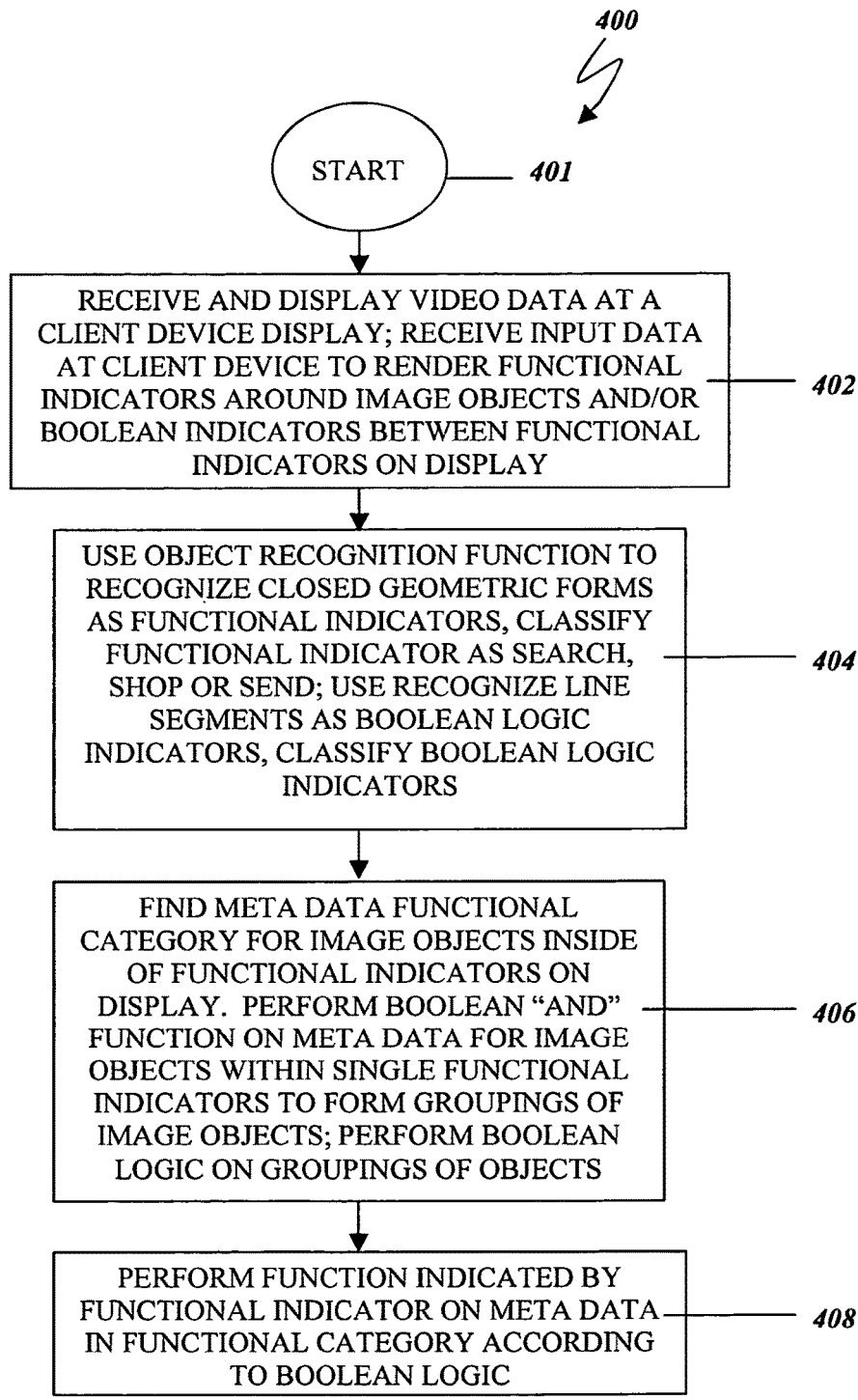
FIG. 4 is a data flow diagram showing an illustrative embodiment of data exchanged and process in a particular illustrative embodiment.

Turning now to FIG. 4, FIG. 4 depicts a flow chart of functions performed in a particular illustrative embodiment. FIG. 4 is one example of functions that are performed in a particular embodiment, however, no mandatory order of execution or mandatory functions are implied or dictated by FIG. 4, as in other particular embodiments, a different order of execution may be performed and particular functions shown in FIG. 4 are left out of execution entirely. The flow chart starts at terminal 401 and proceeds to bock 402. At block 402 an illustrative embodiment receives and displays video data at a client device display; receives input data at client device to draw functional indicators around image objects and/or Boolean indicators between functional indicators on the client display. At block 404 an illustrative embodiment uses object recognition function to recognize closed geometric forms as functional indicators, classify functional indicator as search, shop or send; use object recognition function to recognize line segments as Boolean indicators, classify Boolean indicators. At block 406 an illustrative embodiment finds meta data for image objects inside of functional indicators on display. As described above, different classes of meta are stored which associate with each functional indicator. That class of meta data (search, send, shop) associated with the particular functional indicator (search, send shop) are retrieved for use by the particular function (search, send, shop). An illustrative embodiment performs Boolean AND logic operation on meta data for image objects within single functional indicators to form groupings of image objects; perform Boolean logic operation between groupings of image objects. At block 408 an illustrative embodiment performs function indicated by functional indicator on image objects groups according to Boolean logic operations.

Figure 5:
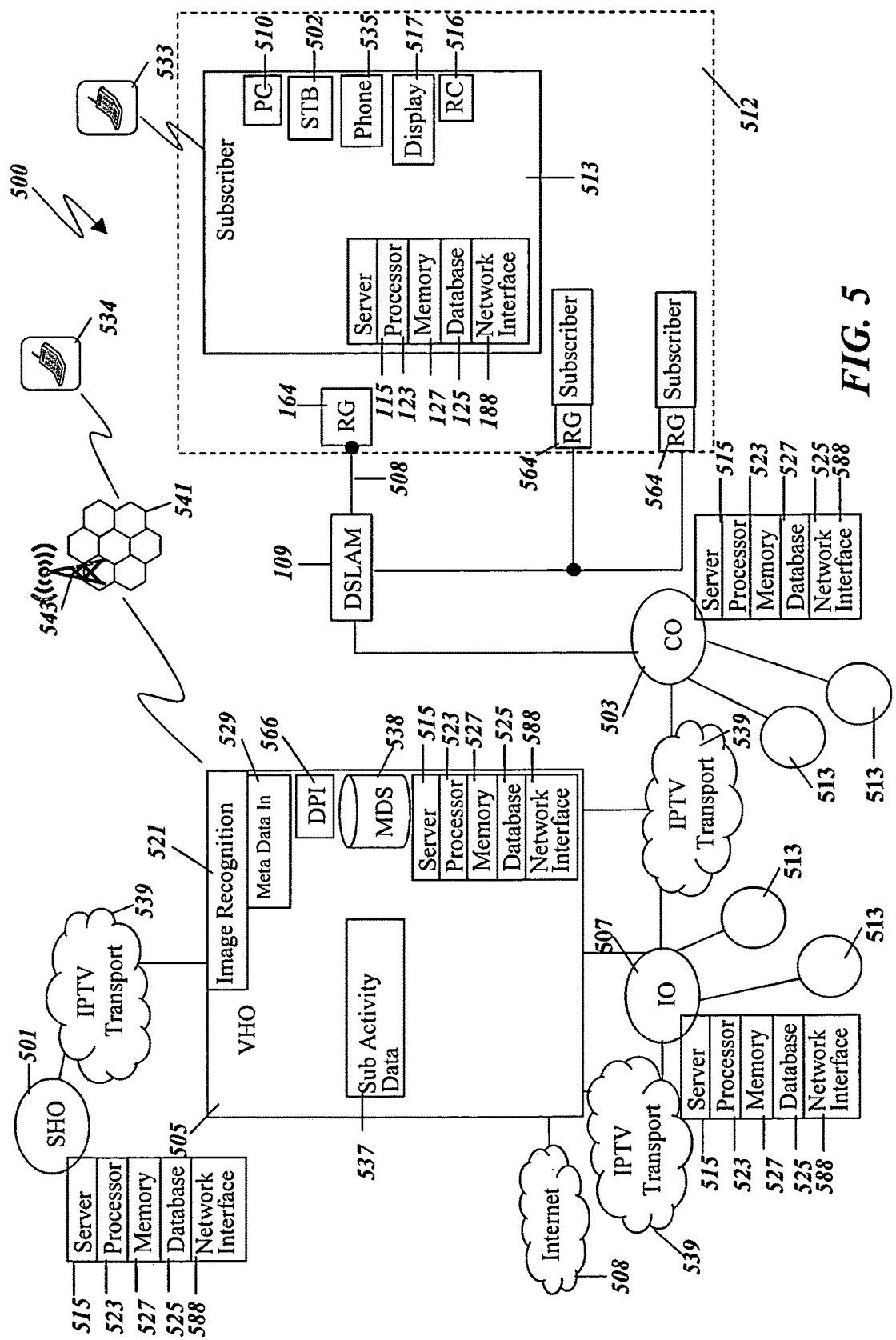
FIG. 5 is a schematic depiction of an data distribution system delivering data to a client device in an illustrative embodiment.

Turning now to FIG. 5, in internet protocol television (IPTV) system is shown delivering internet protocol (IP) video television data to a client device. The IPTV system 500 delivers video data including but not limited to content and different categories of meta data (search, send, shop) to subscriber house holds 513 and associated end user devices (referred to herein as client devices) which may be inside or outside of the household. The video data further includes but is not limited to descriptions of the video content which are embedded in the video data stream such as meta data in an MPEG 7 data stream. In another embodiment the meta data and descriptions are not included in the video data stream but are stored at the server. A pixel region location for an object within a video data frame when a user at an end user device draws a functional indicator around an image object is used to access meta data at the server using the click time and pixel locations within the frame to locate meta data associated with a selected object or objects in the video data stream. The meta data can be preprogrammed and can include but are not limited to text, audio, imagery, reference imagery and video data added to the meta data.

The different categories of meta data are inserted by a video source in the IPTV system or are generated from an aural recognition and pattern recognition analysis of the video data stream and inserted into the video data stream. Video data from live events can be analyzed against meta data reference imagery, reference text and reference audio to generate or find in a database based on a search using key words or reference imagery from the meta data which are then inserted into the video data stream. meta data are inserted by the meta data server 538. In the IPTV system, IPTV channels are first broadcast in an internet protocol (IP) data format from a server at a super hub office (SHO) 501 to a regional or local IPTV video hub office (VHO) server 503, to an intermediate office (IO) server 507 and to a central office (CO) 503. The IPTV system 500 includes a hierarchically arranged network of servers wherein a particular embodiment the SHO transmits video and advertising data to a video hub office (VHO) 503 and the VHO transmits to an end server location close to a subscriber, such as a CO server 503 or JO 507. In another particular embodiment, each of the SHO, VHO, CO and JO are interconnected with an IPTV transport 539. The IPTV transport 539 may consist of high speed fiber optic cables interconnected with routers for transmission of internet protocol data. The IPTV servers also provide data communication for Internet and VoIP services to subscribers.

Actively viewed IPTV channels are sent in an Internet protocol (IP) data multicast group to access nodes such as digital subscriber line access multiplexer (DSLAM) 509. A multicast for a particular IPTV channel is joined by the set-top boxes (STBs) at IPTV subscriber homes from the DSLAM. Each SHO, VHO, CO, IO and STB includes a server 515, processor 523, a memory 527, network interface 588 and a database 525. Analysis of the video data for advertising data key insertion is performed by processor 523 at the VHO. The network interface functions to send and receive data over the IPTV transport. The CO server delivers IPTV, Internet and VoIP content to the subscriber via the IO and DSLAM. The television content is delivered via multicast and television advertising data via unicast or multicast depending on a target television advertising group of end user client subscriber devices.

In another particular embodiment, subscriber devices, also referred to herein as users and as end user devices, are different stationary and mobile devices, including but not limited to, wire line phones 535, portable phones 533, lap top computers 518, personal computers (PC) 510 and STBs 502, 519 communicate with the communication system, i.e., IPTV system through residential gateway (RG) 564 and high speed communication lines such as IPTV transport 539. In another particular embodiment, DPI devices 566 inspect data VoIP, Internet data and IPTV video, commands and meta data (multicast and unicast) between the subscriber devices and the IPTV system severs. DPI devices are used in analysis of the video data for insertion of the meta data based on meta data stored in the data base 525. In a particular embodiment the video data stream is analyzed for imagery, text and audio instances of a particular object selected in the video data stream, such as an actress, e.g. Jessica Alba, adding meta data descriptions as images of Jessica Alba are detected are detected by image recognition devices 521 associated with the DPI devices. meta data describing the instances found by the DPI device are inserted into the video data stream for presentation to a client device. Image, text and sound recognition functions are used to analyze video data for insertion of meta data describing the video, in association with the DPI devices. Textual and aural key words and imagery found in the video data stream are inspected by the DPI devices 566 and image recognition functions 521 in the processors 523 in the communication system servers and are used as meta data describing the objects in the video data stream.

In another particular embodiment, the end client user devices or subscriber devices include but are not limited to a client user computer, a personal computer (PC) 510, a tablet PC, a set-top box (STB) 502, a Personal Digital Assistant (PDA), a cellular telephone 534, a mobile device 534, a palmtop computer 534, a laptop computer 510, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. In another particular embodiment, a deep packet inspection (DPI) device 524 inspects multicast and unicast data stream, including but not limited to VoIP data, Internet data and IPTV video, commands and meta data between the subscriber devices and between subscriber devices and the IPTV system severs.

In another illustrative embodiment data are monitored and collected whether or not the subscriber devices are in the household 513 or the devices are mobile devices 534 outside of the household. When outside of the household, subscriber mobile device data is monitored by communication system (e.g. IPTV) servers which associate a user profile with each particular subscriber's device. In another particular embodiment, user profile data including subscriber activity data such as communication transactions are inspected by DPI devices located in a communication system, e.g., IPTV system servers. These communication system servers route the subscriber profile data to a VHO in which the profile data for a subscriber are stored for processing in determining which objects and meta data would be of interest to a particular end user and which objects in a video stream should be described with the meta data. If a user has an interest in a particular luxury automobile then instances of imagery, text or audio data occurring in the video data stream can be described in the meta data accompanying the video data stream for presentation to a particular user having an interest in the particular luxury automobile. The same or similar meta data can be targeted to other subscriber's in a demographic sector having sufficient income to purchase the particular luxury automobile.

As shown in FIG. 5 advertising sub groups 512 (comprising a group of subscriber house holds 513) receive meta data in a video data stream from IO server 507 via CO 503 and DSLAM 509 at STB 502. Individual households 513 receive the video data stream including the meta data at set top box 502 or one of the other subscriber devices. More than one STB (see STB1 502 and STB2 519) can be located in an individual household 513 and each individual STB can receive a separate multicast or unicast advertising stream on IPTV transport 539 through DSLAM 509. In another particular illustrative embodiment separate and unique meta data are presented at each set top box (STB) 502, 519 tailored to target the particular subscriber watching television at that particular STB. Each STB 502,519 has an associated remote control (RC) 516 and video display 517. The subscriber via the RC selects channels for a video data viewing selection (video programs, games, movies, video on demand) and places orders for products and services over the IPTV system 500. meta data are generated and inserted at the VHO and sent to client devices. In another embodiment, meta data are generated at the end user devices by processors at the end user devices. meta data at the end user devices can then be selected for display by the end user devices based on processing of the meta data described herein.

FIG. 5 depicts an illustrative communication system, including but not limited to a television meta insertion System wherein meta data can be inserted at an IPTV (SHO, VHO, CO) server or at the end user client subscriber device, for example, an STB, mobile phone, web browser or personal computer. meta data can be inserted for selected objects appearing in video data, into an IPTV video stream via meta data insertion device 529 at the IPTV VHO server 505 or at one of the STBs 502, 509. The IPTV servers include an object meta data server 538 and an object meta data database 539. The object meta data is selected by meta data object selection element 529 from the object meta data database 525 based on a subscriber profile indicating objects of interest and delivered by the VHO object meta data server 538 to the IPTV VHO server 515. An SHO 501 distributes data to a regional VHO 503 which distributes the video data stream and meta data to local COs 505 which distribute data via IO 507 to a digital subscriber access line aggregator multiplexer (DSLAM) access node to subscriber devices such as STBs 502, 519, PC 510 wire line phone 535, mobile phone 533 etc. Objects appearing in the video data stream are also selected for meta data description based on the community profile for users in the community and sent to a mobile phone or computer associated with the subscriber or end user devices in the community. The community subscriber profile is built based on a community of subscribers' IPTV, Internet and VoIP activity.

Figure 6:
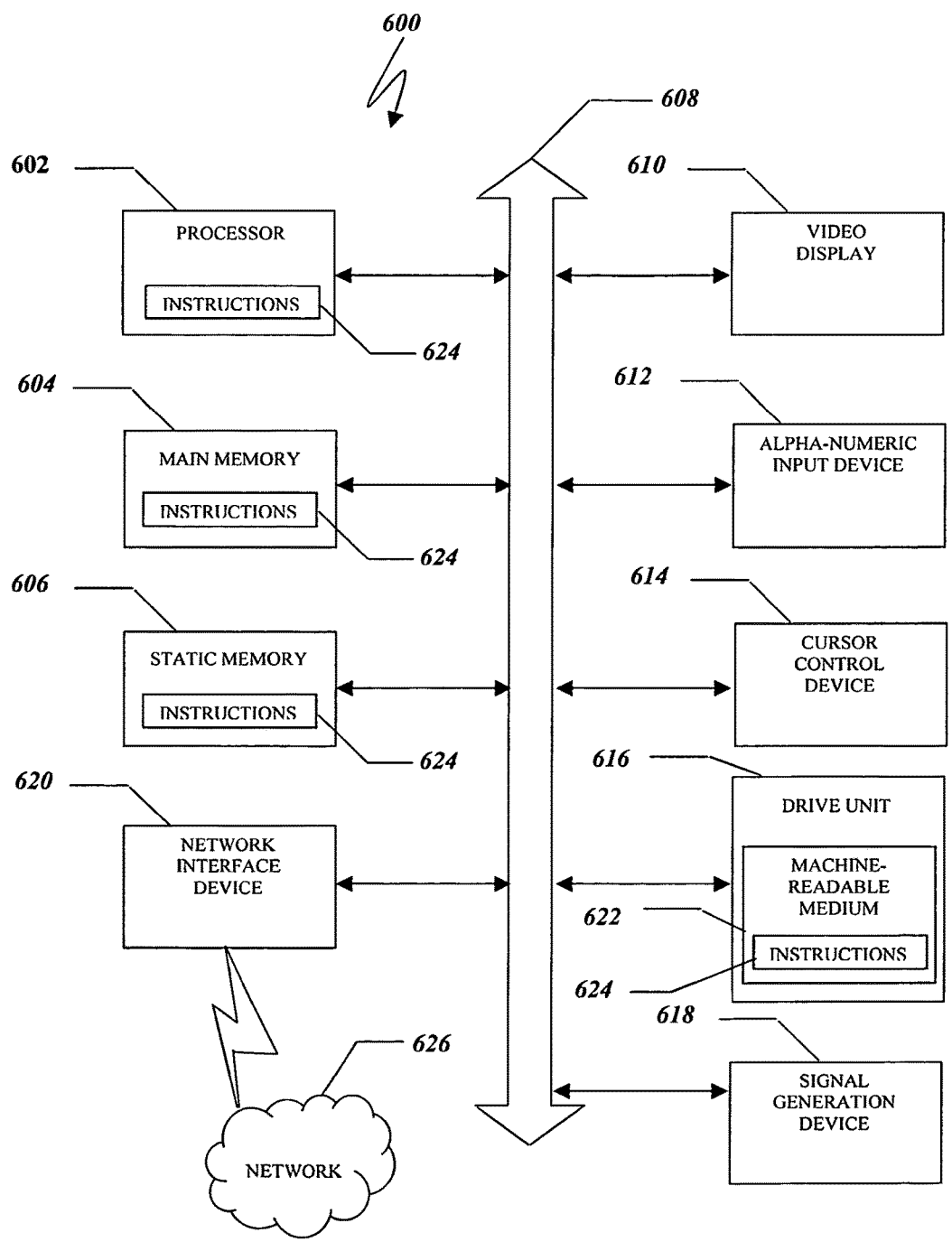
FIG. 6 is a diagrammatic representation of a machine in the form of a computer system within which a set of instructions, when executed, may cause the machine to perform any one or more of the methodologies of the illustrative embodiment.

Turning now to FIG. 6, FIG. 6 is a diagrammatic representation of a machine in the form of a computer system 600 within which a set of instructions, when executed, may cause the machine, also referred to as a computer, to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the terms "machine" and "computer" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystals display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a computer-readable and machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a computer-readable and machine-readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the terms "machine-readable medium" and "computer-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other rewritable (volatile) memories; magneto-optical or optical medium such as a disk or tape; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions.

Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A computerized method for processing an object in a video data stream executed on a client device processor, the method comprising:

receiving input data at a client device for rendering on a client device display a first functional indicator indicating one of a plurality of functions and defining a first geometric form indicating a first region of pixel locations containing a first image object in the video data stream;

performing a function indicated by the first functional indicator on meta data for the first image object in the first region of pixel locations;

receiving input data for rendering a second functional indicator indicating one of the plurality of functions and defining a second geometric form indicating a second region of pixels representing a second image object; and performing the function indicated by the first functional indicator on the meta data for first image object and meta data for the second image object wherein the functional indicator indicates a function of search, send, store, compare and shop and the meta data for the first image object further comprises meta data in one of a plurality of meta data categories associated with one of a plurality of functional indicators, the method further comprising:

rendering a Boolean indicator on a video data frame in the video data stream, the video data frame comprising at least one line on the video frame between the first and second functional indicators to indicate a Boolean logic operation to operate on meta data for image objects surrounded by the first and second functional indicators.

2. The method of claim 1, the method further comprising:
selecting meta data indicated by a meta data category indicator in a meta data category associated with the functional indicator.

3. The method of claim 1, wherein rendering further comprises rendering the first functional indicator using a remote control cursor on the video data frame comprising a closed geometric form.

4. The method of claim 3, wherein the closed geometric form indicates a function wherein a circle geometric form indicates a search function.

5. The method of claim 1, wherein the first functional indicator comprises a single line indicating a Boolean AND logic operation.

6. The method of claim 1, wherein the first functional indicator comprises two intersecting lines indicating a Boolean OR logic operation.

7. The method of claim 1, wherein the first region of pixel locations contains at least two image objects upon which the function performs.

8. The method of claim 1, further comprising, freezing a video data frame for rendering functional and Boolean indicators on the video data frame, wherein a Boolean logic operation is an EXCLUSIVE OR.

9. The method of claim 1, wherein the first image object is an article of clothing included in the video data stream.

10. A computerized method for processing an object in a video data stream, the method executed on a server processor programmed for executing the steps of the method, the method comprising:
  receiving data from a client device indicating one of a plurality of functional indicators indicating one of a plurality of functions and meta data in one of a plurality of meta data categories; and
  receiving input data for rendering a functional indicator indicating one of the plurality of functions and defining a geometric shape indicating a region of pixels representing an image object and performing the function indicated by the functional indicator on the meta data a first image object and meta data for a second image object,
  wherein the functional indicator indicates a function and the meta data further comprises meta data indicator codes indicating one of a plurality of meta data categories and associated with one of a plurality of functional indicators, the method further comprising:
  rendering a Boolean indicator on the video data frame comprising at least one line on the video frame between a first and a second functional indicators to indicate a Boolean logic operation to operate on meta data for image objects surrounded by the first and the second functional indicators.

11. The method of claim 10, the method further comprising:
  performing a function indicated by a functional indicator on meta data in a meta data category; and
  sending data indicating a result of a performing a function to the client device.

12. A system for processing an object in a video data stream, the system comprising:
  a processor in data communication with a tangible non-transitory machine readable medium;
  a first processor interface to receive input data from a client device indicating a first one of a plurality of functional indicators indicating a first function and meta data in one of a plurality of meta data categories;
  a second processor interface to receive input data for rendering a second functional indicator indicating one of the plurality of functions and defining a geometric form indicating a region of pixels representing an image object and performing the function indicated by a first functional indicator on meta data for a first image object and meta data for the second image object; and
  a third processor interface to render a Boolean indicator on a video data frame comprising at least one line on the video data frame between a first and a second functional indicator to indicate a Boolean logic operation to operate on meta data for image objects surrounded by the first and second functional indicators,
  wherein a functional indicator indicates a function selected from the group consisting of search, send, store, compare and shop and the meta data further comprises meta data in one of a plurality of meta data categories associated with one of a plurality of functional indicators.

13. The system of claim 12, the system further comprising:
  a third processor interface to receive data to perform in the processor a function indicated by the functional indicator on meta data; and
  a fourth processor interface to send data indicating a result of the performing a function to the client device.

* * * * *